(12) United States Patent
Jones et al.

(10) Patent No.: US 9,381,707 B2
(45) Date of Patent: Jul. 5, 2016

(54) REPAIR OF COMPOSITE MATERIALS

(75) Inventors: Daniel Thomas Jones, Cowes (GB);
Andrew James Passey, Ventnor (GB);
Iain James Cranwell, Northwood (GB)

(73) Assignee: Gurit (UK) Ltd., Newport, Isle of Wight (GB)

( * ) Notice: Subject to any disclaimer, the term of this patent is extended or adjusted under 35 U.S.C. 154(b) by 541 days.

(21) Appl. No.: 13/515,597

(22) PCT Filed: Dec. 10, 2010

(86) PCT No.: PCT/EP2010/069404
§ 371 (c)(1),
(2), (4) Date: Sep. 27, 2012

(87) PCT Pub. No.: WO2011/073107
PCT Pub. Date: Jun. 23, 2011

(65) Prior Publication Data
US 2013/0012086 A1    Jan. 10, 2013

(30) Foreign Application Priority Data

Dec. 14, 2009  (GB) .................................... 0921800.9

(51) Int. Cl.
*B32B 37/06*   (2006.01)
*B29C 73/10*   (2006.01)
*C08J 5/24*    (2006.01)
*B29C 35/08*   (2006.01)

(52) U.S. Cl.
CPC . *B29C 73/10* (2013.01); *C08J 5/24* (2013.01);
*B29C 2035/0827* (2013.01); *Y10T 156/1039* (2015.01); *Y10T 156/1062* (2015.01); *Y10T 428/249921* (2015.04); *Y10T 428/269* (2015.01); *Y10T 442/2057* (2015.04)

(58) Field of Classification Search
CPC ................................... B29C 73/10; C08J 5/24
See application file for complete search history.

(56) References Cited

U.S. PATENT DOCUMENTS 5,166,007 A * 11/1992 Smith et al. ..................... 428/63
5,487,853 A *  1/1996 Buckley ......................... 264/496
5,732,743 A *  3/1998 Livesay ........................... 138/99

(Continued)

FOREIGN PATENT DOCUMENTS

GB       2216435 A       2/1989
GB       2262817 A  *    6/1993
GB        243346 A       6/2007

(Continued)

OTHER PUBLICATIONS

Apr. 28, 2011 International Search Report and Written Opinion in PCT/EP2010/069404.

(Continued)

*Primary Examiner* — Daniel McNally
(74) *Attorney, Agent, or Firm* — Thereses Hendricks, Esq.

(57) ABSTRACT

A prepreg comprising a fibrous reinforcement layer at least partially impregnated with a matrix resin having a first viscosity, a coating of a wet resin having a second viscosity on a first side of the fibrous reinforcement layer, the first viscosity being higher than the second viscosity, both the matrix resin and the wet resin being curable by ultraviolet radiation, a first removable flexible film which acts as a barrier to ultraviolet radiation on a second side of the fibrous reinforcement layer, and optionally a second removable protective flexible film covering the coating of wet resin.

24 Claims, 3 Drawing Sheets

(56) References Cited

U.S. PATENT DOCUMENTS

| | | | |
|---|---|---|---|
| 5,935,683 A | * | 8/1999 | Iiyama et al. ............ 428/141 |
| 2004/0067335 A1 | | 4/2004 | Li et al. |

FOREIGN PATENT DOCUMENTS

| | | |
|---|---|---|
| JP | 2003175515 A | 6/2003 |
| WO | WO 02/077059 A1 | 10/2002 |
| WO | WO 2009080038 A1 * | 7/2009 |

OTHER PUBLICATIONS

Database WPI, Week 200410, Thomas Scientific, London, GB; AN 2004-093628, XP 002632851, & JP 2003 175515 A (Dainippon Ink & Chem Inc) Jun. 24, 2003 abstract.

GB Search and Examination Report dated Aug. 12, 2010 in corresponding GB0921800.9.

* cited by examiner

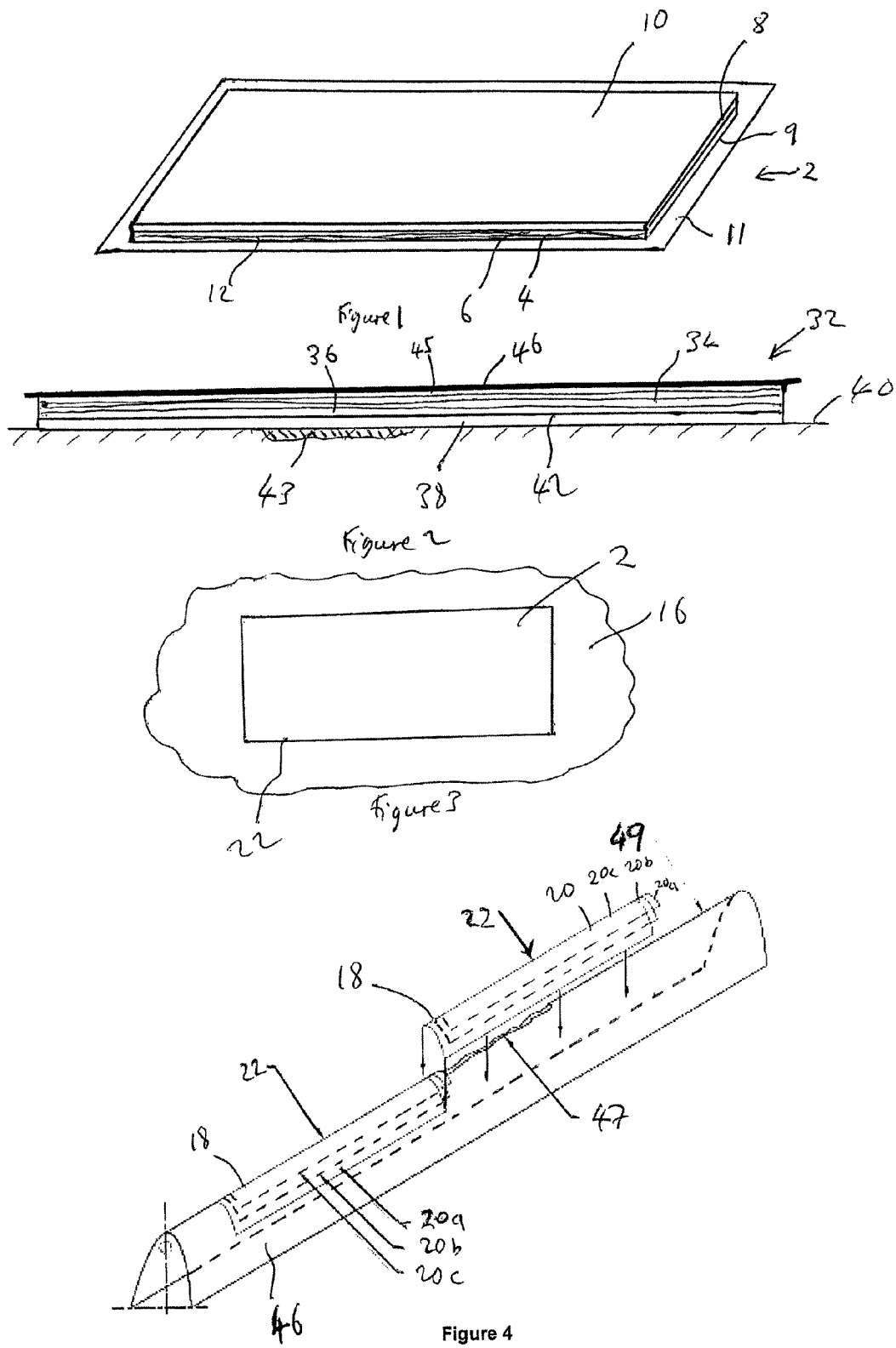

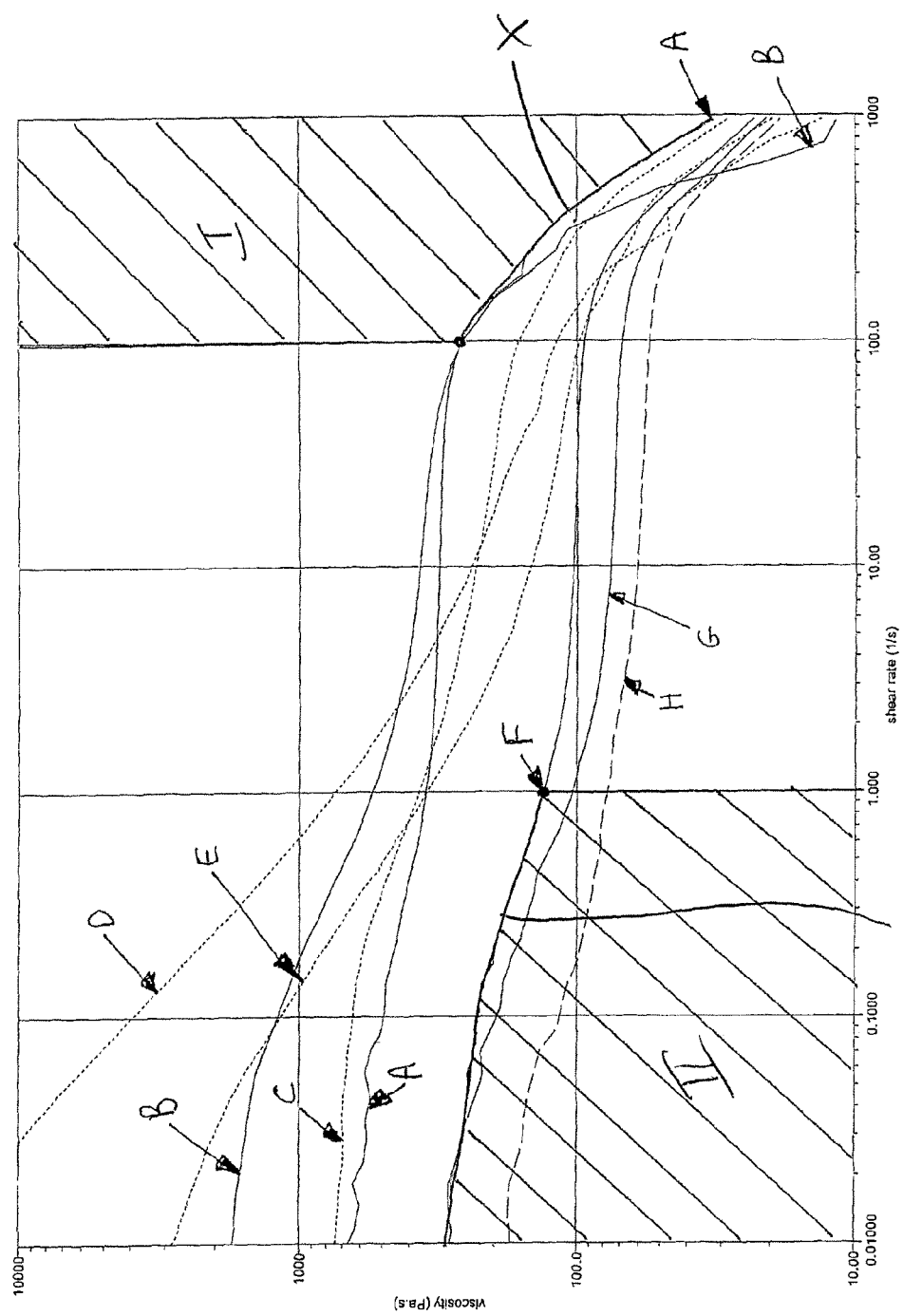

REPAIR OF COMPOSITE MATERIALS

FIELD OF THE INVENTION

The present invention relates to a prepreg for producing a fibre-reinforced resin matrix composite material. More particularly, the present invention relates to the repair of composite materials and in particular to the repair of fibre-reinforced resin matrix composite materials using such a prepreg. The present invention also relates to a kit of parts for forming a repair patch on a fibre reinforced matrix resin composite material. The present invention also relates to a process for a bonding a cured prepreg to a surface of a substrate. The present invention also relates to a holder for a prepreg.

BACKGROUND

Some components made of fibre-reinforced resin matrix composite materials periodically require repair if the surface of the composite material has become damaged during use. Some of these components are installed as part of structures or machines and/or are so large, for example comprise wind turbine blades which may exceed 50 meters in length, so that it is technically and economically expedient to repair them in situ in the field.

It is known to use a wet lamination repair process in which dry fibrous layers and a liquid resin are laid up over the damaged surface and the liquid resin is then cured to repair a structure in situ in the field. In order to ensure resin compatibility, the type of resin selected for a repair usually is the same generic family used to manufacture the original article and most commonly would be polyester, vinyl ester, or epoxy resin. Polyester, vinyl ester repairs are usually done above 15° C. as these resins are difficult to cure and adhere below this temperature and can exhibit permanent undercure even when subsequently heated if gelled at a low temperature. Epoxy resins can be formulated to adhere to polyester, vinyl ester as well as epoxy substrates and are often the material of choice. However such conventional curing wet-laminating epoxy resin are prone to "bi-product" at low ambient temperatures and at high ambient humidity, such a bi-product phenomenon resulting from the amine curing agents tending to react with atmospheric carbon dioxide and moisture to form an ammonium carbamate layer causing poor subsequent over laminating adhesion. A further consequence is that the amine compounds intended to react with the epoxy compounds are consumed in the reaction with moisture and carbon dioxide. As a consequence, not all the epoxide groups are reacted, leaving under cured resin resulting in low mechanical and thermal performance.

A further problem at low temperatures is providing a balance of pot life, when the resin is mixed, and when the resin is spread out to form a thinner layer on the substrate. To cure at low temperatures, reactive compounds are needed to cure the resin as a thin layer which makes it very difficult to mix the resin due to very short pot-lives.

To repair a part where access is difficult or limited (for example for making an in situ repair of a wind turbine blade), it is common practice to first inspect the damage and cut the required fabric (e.g. of fibre glass) to shape. The fabric is placed on a backer and the liquid resin is then used to impregnate the fibres, thereby forming a "wet preg". These wet preg preforms are difficult to handle because of the presence of liquid resin. If the fibre glass fabric is first cut to shape, the act of wetting out and handling the fabric distorts the shape and it no longer is a good fit to the original defect shape and the desired fibre alignment can be lost. The liquid resin tends to drip and cover the non repair areas requiring substantial post repair clean up. The liquid resin tends to transfer onto the operator's protective gloves, and then easily onto tools, clothing, and the non repair areas. When access is difficult, such as repairing a wind turbine blade from a rope line or platform, often in windy conditions, the handling problems are even more prominent.

Therefore such a wet lamination repair process cannot reliably be used under certain environmental conditions in the field. Also, wet laminating is messy and time consuming in the field.

It is also known to use conventional prepregs in a repair process in the field. However, such prepregs require initial vacuum bagging, to evacuate air from between the prepreg and the substrate and from between adjacent prepreg plies, and subsequent heating, to provide low enough viscosity and consolidation pressure to ensure sufficient wetting between the prepreg plies and substrate, full fibre wet out if the prepreg was not already fully impregnated, and enough time at temperature to cure the prepreg resin. This is difficult and time consuming to do reliably, particularly to ensure that the prepreg laminate is fully and uniformly heated to ensure wet out and resin curing throughout the laminate. When using both conventional thermal cured and UV curable prepregs to repair the leading edge of a wind turbine blade, it has been found that applying the pre-preg directly to the damaged surface under ambient temperature and without additional heat results in no or only very poor adhesion between the prepreg and the substrate as the prepreg is not able to easily wet the substrate surface. A heat rolling step can be used to adhere a conventional prepreg, but this process extends the application time and still only provides poor adhesion. In the field it is difficult to guarantee that the required temperature between the prepreg and the substrate has been achieved uniformly over the surface area of the repair. Additionally, even with heating it is difficult to cause the prepreg resin to flow in order to reduce any resin high spots or to fill with resin any low spots in the substrate. At the edges of the prepreg ply, where there is a height difference between adjacent prepreg plies, drop offs can occur leading to more voids in the repair. Furthermore, if resin heating is required it is necessary to provide a common heater mat for different sized and shaped damaged areas.

U.S. Pat. No. 5,732,743 discloses a method of sealing pipes, for example to join or repair the pipes, using a prepreg. However, the prepreg and method disclosed do not provide a durable repair, would be unsuitable for repairing large areas, such as on a wind turbine blade, and would be difficult to apply in the field when exposed to ambient environmental conditions. U.S. Pat. No. 5,166,007 discloses a patch or repair assembly, including a prepreg, for repairing vehicles. U.S. Pat. No. 5,554,666 discloses a photocurable putty or molding. US-A-2004/0067335 discloses a method of repairing damaged concrete structures using wet-laminating of fibre-reinforced polymer composites. EP-A-0025359 discloses photocurable prepregs. EP-A-0922727 discloses photocurable prepregs for waterproofing.

None of these prior art documents provides a fibre/resin combination or method which enables the reliable and speedy production of a durable repair of a substrate, in particular over a large area, such as on a wind turbine blade, which can be applied in the field when exposed to a variety of ambient environmental conditions.

SUMMARY OF THE INVENTION

The present invention provides a prepreg comprising a fibrous reinforcement layer at least partially impregnated with a matrix resin having a first viscosity, a coating of a wet resin having a second viscosity on a first side of the fibrous reinforcement layer, the first viscosity being higher than the second viscosity, both the matrix resin and the wet resin being curable by ultraviolet radiation, a first removable flexible film which acts as a barrier to ultraviolet radiation on a second side of the fibrous reinforcement layer, and optionally a second removable protective flexible film covering the coating of wet resin.

The present invention also provides a kit of parts for forming a repair patch on a fibre reinforced matrix resin composite material, the kit comprising (a) a prepreg comprising a fibrous reinforcement layer at least partially impregnated with a matrix resin having a first viscosity and (b) a supply of a wet resin, the wet resin comprising a coating resin for forming a coating on the prepreg, and optionally a filler resin for filling surface defects, wherein the matrix resin has a viscosity higher than the viscosity of the wet resin and both the matrix resin and the wet resin being curable by ultraviolet radiation.

Preferably, the wet resin is adapted to provide, after curing, a sandable final surface for the repair patch.

The present invention also provides a process for a bonding a cured prepreg to a surface of a substrate, the process comprising the steps of:
  (i) providing a prepreg comprising a fibrous reinforcement layer at least partially impregnated with a matrix resin having a first viscosity, a first side of the fibrous reinforcement layer carrying a coating of a wet resin having a second viscosity, the first viscosity being higher than the second viscosity, both the matrix resin and the wet resin being curable by ultraviolet radiation;
  (ii) applying the prepreg to the substrate by urging the coating against the substrate surface; and
  (iii) curing the matrix resin and the wet resin using ultraviolet radiation.

Typically, a layered stack comprising a plurality of the prepregs is applied, for example by applying layers sequentially, to form a multilaminar repair patch on the substrate.

The prepreg resins may be readily formulated so as to be capable of bonding to a variety of substrate materials, in particular fibre-reinforced composite materials incorporating a matrix resin composed of polyester, epoxy or other commonly used resin matrix resin.

The present invention further provides a holder for a prepreg, the holder comprising at least one hollow rigid elongate tube of material which is substantially opaque to UV radiation, and at least one removable end cap, composed of material which is substantially opaque to UV radiation, covering at least one end of the tube.

The holder may comprise an interconnected array of the hollow rigid tubes. The tube may be cylindrical or square in cross-section.

The present invention further provides an assembly of a holder according to the invention containing, in a respective tube, a prepreg comprising a fibrous reinforcement layer at least partially impregnated with a matrix resin and a coating of a wet resin on a first side of the fibrous reinforcement layer, both the matrix resin and the wet resin being curable by ultraviolet radiation, the prepreg being at least partially bent about a longitudinal axis of the tube so that a second side of the fibrous reinforcement layer lies adjacent to an inner surface of the respective tube, the length of the prepreg extending around the inner surface being less than the peripheral length of the inner surface, and the coating of wet resin being free of contact with the tube.

BRIEF DESCRIPTION OF THE DRWAINGS

Typically, the prepreg is deformed by bending within the tube and the restorative force back towards a planar configuration urges the prepreg against the inner surface.

Embodiments of the present invention will now be described by way of example only with reference to the accompanying drawing, in which:—

FIG. 1 is a schematic perspective view of a prepreg in accordance with a first embodiment of the present invention;

FIG. 2 is a schematic cross-sectional side view of a prepreg in accordance with a second embodiment of the present invention on a substrate;

FIG. 3 is a schematic plan view of the repair of a substrate using a prepreg in accordance with FIG. 1;

FIG. 4 is a schematic perspective view of the repair of a leading edge of a wind turbine blade using a prepreg in accordance with FIG. 2;

FIG. 7 shows the variation of viscosity with shear rate for coating resins used in preferred embodiments of the present invention.

DETAILED DESCRIPTION

Figure 5:
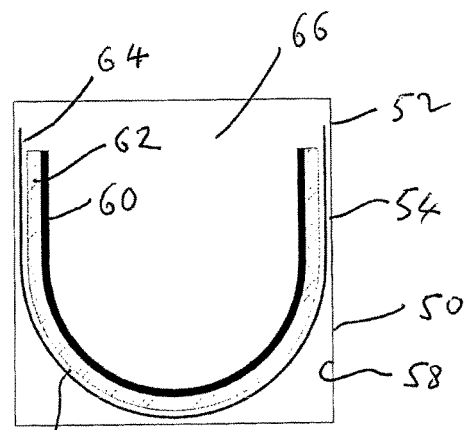
FIG. 5 is an end view of a holder for a prepreg in accordance with a further embodiment of the present invention.

FIG. 1 illustrates a prepreg in accordance with a first embodiment of the present invention. The layer thicknesses are exaggerated for clarity of illustration. Also for clarity of illustration, the prepreg is shown in an upside down configuration—the upper surface would usually be the lower surface when the prepreg is being applied to a substrate. The prepreg 2 comprises a fibrous reinforcement layer 4 fully or partially impregnated with a matrix resin 6 having a first viscosity. The fibrous reinforcement layer 4 is coated on one side 8 with a coating 10 of a wet resin having a second viscosity. The first viscosity is higher than the second viscosity to provide a dual viscosity prepreg according the present invention. On the other side 9 of the prepreg 2 the fibrous reinforcement layer 4 is coated with a removable flexible film 11 which acts as a barrier to ultraviolet (UV) radiation. The film 11 may comprise a plastics film, for example of polyethylene or polyethylene terephthalate, containing a UV absorbing material. Such a UV absorbing film is known in the art. The film 11 may, as shown, be oversized so as to extend beyond the edges of the prepreg 2 around the periphery of the prepreg 2.

More particularly, the fibrous reinforcement layer 4 of the prepreg 2 is impregnated with a high viscosity thermosetting matrix resin 6 which is curable by ultraviolet (UV) radiation at ambient temperature, typically from 5 to 35° C. Preferably, the photocurable resin, which contains a UV-curing photoinitiator, is selected to provide that the UV intensity to achieve full cure of the resin within a curing time of 12 hours or less is provided by ambient light and typically within a period of 30 minutes with a high intensity UV source such as a light emitting diode (LED), mercury vapour, or microwave-based UV source.

The viscosity of the UV curable matrix resin 6 is selected so as to give (a) low or moderate tack and (b) drape to the prepreg 2 during the in situ repair, as discussed below the resin optionally being selected so as to provide the desired properties across a particular range of ambient temperatures likely to be experienced during use. While it is desirable to have a single prepreg product that can work effectively over the complete desired temperature range of 5-35° C., such a prepreg can have ideal properties within a mid range of working temperatures but potentially be compromised at the extreme temperature ends, for example by being too tacky at 35° C. and having too low drape at 5° C. Optionally, different classes of the prepregs can be supplied, each with a respective resin optimised for a given temperature sub-range: for example in one embodiment low 5-15° C., medium 15-25° C., and high (25-35° C.) working temperature products, with the ranges typically having an overlap, or in another embodiment range A for use between 5-25° C., and range B for use between 20 and 35° C.

The lower threshold of the viscosity is first selected to be sufficiently high so that the matrix resin maintains the general form of the prepreg material and maintains fibre alignment so that the prepreg can be cut accurately and maintain dimensional accuracy. However, the lower threshold of the viscosity of the resin is also selected so that the resin exhibits only low or moderate tack, so that the resin is easy to handle and does not inadvertently stick excessively strongly to surfaces, such as the gloves of an operator during the on-site use. The upper threshold of the viscosity is selected to be low enough that the prepreg has drape and so can be conformed to the required geometry of the repair.

Furthermore, as stated above the viscosity of the matrix resin 6 in the prepreg 2 is relatively high. This provides that prior to the UV curing stage, which is typically carried out at ambient temperature, the resin exhibits low or even negligible flow properties in-order for the resin to be easy to cut and handle. To be suitable for use at 5° C. and 35° C., the prepreg matrix resin material preferably has a viscosity of from $1 \times 10^4$ to $2 \times 10^6$ Pa·s at 20° C., more preferably from $2 \times 10^4$ to $1 \times 10^6$ Pa·s at 20° C.

In this specification, the viscosity of matrix resin 6 in the prepreg 2 was measured using a TA Instruments AR2000 rheometer with a 20 mm diameter steel plate, a gap of 1000 μm and Peltier cooling system. Measurements were performed in oscillation from 40° C. down to −10° C. at a cooling rate of 2° C./min with a controlled displacement of $1 \times 10^{-4}$ rads at a frequency of 1 Hz.

In this specification, the viscosity of wet resin 10 on the prepreg 2 was measured with a TA Instruments AR2000 rheometer with a 20 mm diameter steel plate, a gap of 1000 μm and Peltier cooling system. Measures were performed by loading the sample and leaving to equilibrate for 35 minutes. Steady state flow viscosity measurements were performed at $0.01\ s^{-1}$ until the material had achieved an equilibrium viscosity. The material was then subjected to a continuous ramped shear rate sweep from $0.001\ s^{-1}$ to $1000\ s^{-1}$ in 3 minutes.

The sag resistance of the wet resin 10 was tested by casting horizontal lines of resin at 1.0, 2.0, 3.0, 4.0 and 5.0 mm thickness. The cast resin lines were then placed vertically to cause the lines of resin to sag while observing for movement or running of the resin without the presence of UV curing light at 20° C. The sag resistance was determined as being the maximum film thickness that could be cast without the resin running or an observable slump within set time periods.

The ability to support of the wet resin 10 to hold multiple piles of pre-preg 2 vertically on a repaired substrate was also tested by coating 400 gsm of the wet resin 10 onto a stack of a plurality of 2400 gsm glass prepregs, each with an average 44% resin content, the stack height equating to a cured composite material thickness of approximately 2.5 mm. This stack was applied to a laminate substrate and the air removed using a squeegee technique. The stack was then placed vertically and the distance with respect to time that the stack moved from the starting datum was recorded at 20° C. UV-curable resins are known in the art. For example, the resin may comprise a thermosetting resin having one or more ethylenically unsaturated copolymerisable monomers, for example selected from polyester, vinyl ester or acrylic ester. Typically, the thermosetting resin comprises acrylate and/or methacrylate monomers. The thermosetting resin may additionally comprise one or more ethylenically unsaturated comonomers, for example styrene or vinyl toluene, which may be present to lower the viscosity of the resin to assist fibre impregnation by the matrix resin during manufacture of the prepreg. Most preferably, the UV-curable matrix resin is either a high molecular weight resin suitable for hot melt impregnation or made from a low starting viscosity that is either partially cured, or another mixed with a thickening additive added to increase the viscosity to a prepreg texture after impregnation, known in the art as "staged" or "advanced", so that the prepreg resin has the correct viscosity and can readily be cured completely and rapidly by UV radiation under ambient light and ambient temperature conditions. Such staging or advancing to achieve a desired resin viscosity is well known to those skilled in the art of prepreg manufacture.

The fibrous reinforcement layer 4 comprises fibres 12 made of glass, carbon, aramid or similar materials. The fibrous reinforcement layer 4 may comprise woven or non-woven fibres, and may comprise more than one layer of fibres. The fibres 12 may be unidirectional (UD), being oriented in a common longitudinal direction, or may be biaxial or multi-axial. For example, the fibrous reinforcement layer 4 may be uniaxial with fibres orientated at 0°, biaxial, with fibres oriented at +45/−45° or +90/−90° to the longitudinal direction of the prepreg or multiaxial with fibres oriented at +45/−45° or +90/−90° to unidirectional fibres in the prepreg, the latter extending in the longitudinal direction of the prepreg.

In this specification, surface tack of the resin is measured according to the following testing protocol:

Surface Tack Testing Protocol
1) Allow prepreg sample to stand at Lab temperature (22° C.+/−2° C.) for approximately 10 minutes.
2) Remove the backer on one side.
3) Fold a sample of the prepreg over on its self and stick sides together.
4) Apply light pressure.
5) Carefully peel the prepreg apart and measure the tack level according to the Tack Test Table below:

| Rating | Description |
|---|---|
| ZT-Zero | Tack |
| QC-0 | Does not stick at all. Surface dry to the touch. |
| LT-Low | Tack - gloved finger easily removed after touching surface |
| QC-1 | Sticks only with firm pressure. Parts very easily. Surface quite dry to the touch |
| QC-2 | Sticks with medium pressure. Parts very easily. Surface has some stickiness |
| QC-3 | Sticks with light pressure. Parts easily. Surface has some stickiness |
| MT-Medium | Tack - gloved finger not easily removed after touching surface |
| QC-4 | Sticks with little pressure. Parts easily. No fibre movement on parting |
| QC-5 | Sticks with little pressure. Parts with some effort. Little fibre movement on parting |
| QC-6 | Sticks with little/no pressure. Parts with some effort. Some fibre movement on parting |
| HT-High | Tack - gloved finger left with resin on after touching surface |
| QC-7 | Sticks with no pressure. Parts with effort. Fibre distorted on parting |

-continued

| Rating | Description |
| --- | --- |
| QC-8 | Sticks with no pressure. Parts with much effort. Fibre distortion on parting & resin "strings" |
| QC-9 | Sticks with no pressure. Parts with much effort. High fibre distortion on parting & resin "strings" |
| XT-Extreme | Tack - glove stretched or torn on attempting to remove it from the surface |
| QC-10 | Sticks with no pressure. Cannot peel apart without destroying fabric/fibre alignment |

In accordance with the preferred embodiments of the present invention, preferably the surface tack of the matrix resin ranges from QC0 to QC7, for on-site application temperatures of 5 to 25° C. and from QC3 to QC10 for on-site application temperatures of 5 to 25° C., when tested with the above protocol at 22° C.+/−2° C.

As described above, the prepreg 2 has a coating 10 of low viscosity wet resin. That coating has a paste-like consistency and preferably has a maximum viscosity of 275 Pa·s at a shear rate of 100 $s^{-1}$ to enable air removal during application and optionally a viscosity at least 130 Pa·s at a shear rate of 1 $s^{-1}$ to provide sag resistance at the desired temperature of use.

Typically, at a shear rate of 100 $s^{-1}$ the viscosity is from 40 to 275 Pa·s, more preferably from 50 to 250 Pa·s, yet more preferably from 75 to 200 Pa·s, still more preferably from 75 to 175 Pa·s. Typically, at a shear rate of 1 $s^{-1}$ the viscosity is from 130 to 1000 Pa·s, more preferably from 250 to 1000 Pa·s, yet more preferably from 250 to 750 Pa·s, still more preferably from 300 to 750 Pa·s.

If the coating is too high in viscosity, the ability to remove air by the squeegee technique on larger prepreg pieces, and to slide the prepreg into position becomes difficult. If the resin is too low in viscosity, air is easily removed but the resin can drip to contaminate non-repair areas if any excess is squeezed out of the patch repair edges during the application of the prepreg. If the resin is too low in viscosity, the resin may not have enough sag resistance to hold the repair in-place until the cure has advanced the resin to a sufficient state of cure to prevent movement of the repair.

Further improvements in the handling properties of the prepreg can be made by using one or more known thixotropic agents such as silica which help maintain sag resistance at low shear rate but at higher shear rates thins to allow easier spreading and sliding of the coating 10 on the prepreg 2. It is preferable to minimise the amount of silica, because excess silica can make the resin more expensive, brittle, difficult to sand to a final finish, and, at higher levels, can impair the UV curing.

A lack of sag resistance, although undesirable, can be accommodated. For example, immediately after application to the substrate the repair patch can be temporarily held in place (for example manually) and during such holding the coated wet resin is allowed or caused to cure, for example in sunlight, and/or by providing a short dose of higher intensity UV light from a UV source such as a lamp, to advance the cure of the resin to a sufficient state to enable the resin securely to hold the repair in the desired position. Optionally only a small area of the repair can be exposed to the UV source to spot tack the repair in place. It is more important to limit the maximum viscosity of the coating resin to enable a squeegee technique to be used to remove any entrapped air between the substrate and the prepreg or between any subsequent layers of prepreg.

The cure rate of the paste may be modified to provide a more rapid cure to compensate for lower sag resistance. The cure rate may be modified by changing the reactive groups in the resin, the type and amount of inhibitors, and/or the curing agent. Typically, working times, when the wet resin coating or paste permits spreading of the resin, sliding of the patch, and air removal, of from 30 seconds to 10 minutes are preferred, more preferably from 1.5 to 5 minutes.

A paste that performs both in terms of sag resistance and air removal at 35° C. may be is too thick to work at 5° C. and conversely a paste that reliably works at 5° C. may provide little sag resistance and may drip at 35° C.

At the desired temperature of use the resin material of the coating 10 preferably has a maximum viscosity of 275 Pa·s at a shear rate of 100 $s^{-1}$ to enable air removal during application and optionally a viscosity at least 130 Pa·s at a shear rate of 1 $s^{-1}$ to provide sag resistance at the desired temperature of use. Such a resin with this viscosity when measured at 20° C. may be suitable for effective use at the lower and upper ends of an ambient temperature working range which may extend from a minimum of 5° C. to a maximum of 35° C. However, both the matrix and the wet resin viscosity may be selected so that the prepreg has a narrower ambient temperature working range, for example comprising temperature bands, which may partially overlap, Accordingly, plural prepreg samples may be provided so that more than one selection of resin material of the coating 10 and prepreg material 2 are provided to enable the on site user to select the prepregs having the appropriate resin material for the ambient conditions of the day by providing packs of material that operate in a more preferred manor in a narrower subset of the 5 to 35° C. desired temperature range. For example three prepreg classes may be provided for low 5-15° C., medium 15-25° C., and high 25-35° C. ambient temperature applications, or more preferably two pack selections may be provided, one for use between 5-25° C., and the other for use between 20 and 35° C. Preferably material of the coating 10 has a maximum viscosity of 275 Pa·s at a shear rate of 100 $s^{-1}$ to enable air removal during application and optionally a viscosity at least 130 Pa·s at a shear rate of 1 $s^{-1}$ for the desired temperature range, and at at least one temperature within the range of 5° C. to 35° C.

The low viscosity coating 10 is formed of a thermosetting resin which is also curable by ultraviolet (UV) radiation at ambient temperature, typically of from 5 to 35° C. Again, the photocurable resin contains a UV-curing photoinitiator, examples of which are well known in the art. These can include Type 1 free radical photoinitiators which undergo fragmentation on exposure to irradiation, such as α-hydroxy ketones (AHK), α-amino ketones (AAK), and acyl phosphines (MAPO/BAPO). For example, commercially available photoinitiators may be used, such as Irgacure 819 (BAPO), Irgacure 2022 (a blend of Irgacure 819 (BAPO) and Darocure 1173 (AHK)), Darocure TPO (MAPO), and Irgacure 2100/phosphine oxide.

Alternatively Type II free radical photoinitiators such as benzophenone, fluorenone, and thioxanthone may also be used.

Both Type 1 and II free radical photoinitiators may also be used in combination. A photosynergist compound, such as a tertiary amine, for example triethanolamine (TEA) or methyldiethanolamine (MDEA), may also be used to adjust the reactivity and through cure of the material. In order to change the cure rate, optionally cure inhibitors, known in the art, may be used in combination with variation of the amount of curing agent present.

Using these combinations of photoinitiators, synergists and inhibitors, the desired wavelength and speed of curing can be adjusted. The pre-preg can be capable of curing using natural daylight or designed to be more tolerant to natural exposure and selected to cure with a UV source such as electrode and electrodeless lamps using energised mercury vapour to produce the UV radiation or LED based UV emitters.

Preferably the combination is selected to provide that the UV intensity to achieve full cure of the resin within a curing time of 12 hours or less is provided by ambient light and within 30 minutes using a higher intensity UV source. More preferably the combination is selected to provide that the UV intensity to achieve full cure of the resin within 15 minutes using a higher intensity UV source.

Again, as for the matrix resin, the resin of the coating 10 may comprise a thermosetting resin having one or more ethylenically unsaturated copolymerisable monomers, for example selected from polyester, vinyl ester or acrylic ester. Typically, the thermosetting resin comprises acrylate and/or methacrylate monomers. The thermosetting resin may additionally comprise one or more ethylenically unsaturated comonomers, for example styrene, or vinyl toluene, which may be present to lower the viscosity of the resin. Preferably, the coating resin can readily be cured completely and rapidly by UV radiation under ambient light and ambient temperature conditions.

The low viscosity of the resin of the coating 10 means that the coating 10 is perceived by the user as wet. The coating 10 facilitates wetting of, and adhesion to, the substrate to which the prepreg is applied in use during a repair process. When the repair process requires the formation of a stack of prepregs, forming a multi-ply prepreg structure over the surface to be repaired, each prepreg is applied with the coating 10 facing towards the substrate, and so subsequent prepreg plies are applied with the coating 10 applied to the upper surface of a previous prepreg ply, the coating thereby increasing interply adhesion within the stack.

Typically, the coating 10 has a thickness of from 35 μm to 1000 μm, more preferably from 100 μm to 400 μm.

The viscosity of the coating 10 is selected so that wet resin can be made to flow into an uneven surface of an underlying substrate to which the prepreg 2 is applied, with the coating 10 directly contacting the substrate surface. Typically, after application of the prepreg 2, pressure is applied by a smoothing wiping action over the prepreg upper surface, for example using a flexible blade (e.g. a squeegee) to ensure that any entrapped air is removed from the interface between the substrate surface and the prepreg. If subsequent prepreg layers are laminated over the initial prepreg layers, then such a wiping technique may similarly be used to remove inadvertently entrapped air from the interface between adjacent prepreg plies. Formulation of this wet resin can give enhanced adhesion and toughness to the substrate.

By providing such a low viscosity coating layer, good adhesion is achieved of the prepreg to the underlying substrate surface, and between adjacent prepreg plies, without requiring any external heat or consolidation air pressure to be applied to the pre-preg to cause the coating resin to flow so as to be in intimate uniform contact with the substrate surface. The low viscosity coating layer readily provides the desired shape and dimensions to the outer surface of the prepreg repair patch, in particular so as to have the outer surface of the prepreg repair patch correspond as closely as possible to the original surface of the substrate prior to damage.

For conventional UV curable resin materials, since the cure is rapid under UV light it would be difficult to achieve consistent and uniform surface wetting if a resin is applied directly to the substrate surface. By providing a low viscosity coating layer on the prepreg surface, which layer cures by UV radiation at substantially the same time as the matrix resin of the prepreg, the user is readily able to apply manual smoothing and levelling pressure over the repair patch surface in order to spread the resin, smooth out any high spots and fill any low spots in the surface, and to achieve lamination of adjacent prepreg layers with a desired outer surface profile. The low viscosity coating layer does not commence gelling and curing prematurely during the application because it has been applied to the prepreg surface and is shielded from UV radiation by the prepreg backer which is then removed to commence curing.

The UV curable coating 10 has a particularly preferred viscosity range which permits the manual smoothing and levelling pressure, for example using a squeegee technique, reliably and repeatably to be achieved. If the viscosity of the coating 10 is too low, then the resin is prone to drip, and after application of the prepreg to the substrate, the prepreg can slide under its own weight. If the viscosity of the coating 10 is too high, then it is difficult for a user to squeegee out any the air trapped during lamination. The selected low viscosity range permits the prepreg to be reliably adhered over its whole surface to the underlying substrate surface, the thickness of the coating to be variable after application of the prepreg using manual smoothing and levelling wiping pressure and the prepreg to be slidably repositionable over that surface to the desired location. Furthermore, a key advantage of the prepreg of the present invention over a wet-lamination process is that because the prepreg includes a higher viscosity matrix resin impregnated into the fibrous reinforcement, to provide a drapable prepreg, this provides that the prepreg holds its shape better and is less messy to handle as compared to a wet lamination lay-up of liquid resin and initially dry fibres.

This prepreg of the present invention may be used to form a multi-layer stack, laminated layer-by-layer, as for a conventional pre-preg lay-up. The advantages of achieving ready control of the outer shape and dimensions of the outermost surface of the resultant repair patch on the previously uneven damaged substrate surface, and repositionability of the successive prepreg plies, result from the prepreg incorporating dual layer, different viscosity, UV curable resin materials.

The coating 10 may be provided initially with a removable flexible backer sheet (not shown) to protect the coating 10 prior to use. Typically, the backer sheet comprises a plastics film, for example of polyethylene or polyethylene terephthalate. In order to facilitate removal of the backer sheet from the on the low viscosity "wet" coating 10, without inadvertently transferring resin onto the removed backer sheet or onto the operator, resulting in a less clean process, the "wet" side of the prepreg can optionally be chilled to a low temperature, for example to a temperature 15° C. below the current ambient condition, immediately prior to removal of the backer sheet. The chilling could be provided by a freezer spray, a chilled roller at an unwind station for removing a web of the backer sheet, a chilled bench area, ice pack, etc. After the prepreg has been chilled, typically the prepreg is disposed in a darkened environment away from UV radiation to avoid premature resin curing, and then pre-conditioned for a period of time under ambient temperature in order to warm the prepreg up to a working temperature prior to application to a substrate.

This coated prepreg is simple to manufacture and use in a repair process, and provides a high quality, durable repair.

In accordance with a second embodiment of the present invention, as shown in FIG. 2 the prepreg 32 comprises a fibrous reinforcement layer 34 fully or partially impregnated with a matrix resin 36 having a first viscosity, as for the first embodiment illustrated in FIG. 1. Again, layer thicknesses are exaggerated in the Figure. However, the fibrous reinforcement layer 34 is not pre-coated on one side with a coating of the wet resin. Instead, the wet resin 38, which may be the same resin as used for the first embodiment, is applied to the lowermost prepreg surface 42 immediately prior to application of the prepreg 32 to the substrate surface 40 and optionally, as required, is initially applied to the substrate surface 40 as a filler 43. Therefore in this embodiment the wet resin can be utilised as a multifunctional resin, both as a repositionable and smoothable/levellable adhesive between the prepreg and the underlying substrate, and additionally as a filler to fill large holes or cavities in the substrate surface to be repaired, and further as a filling and fairing compound on the outer surface providing an final surface which is both easy to sand and provides a surface suitable for paints and other top coatings to adhere to. The uppermost prepreg surface 45 is covered with a removable UV blocking backer film 46.

The prepreg of the embodiment of FIG. 1 may be used in the following repair process, illustrated with reference to FIG. 3, by way of example.

In a first step, the substrate surface 16 to be repaired is abraded, for example by a sanding disc, to provide a sound, roughened surface. Optionally wet resin can be applied to fill in any larger, localised holes or surface irregularities. Then a prepreg ply 2 having the structure of the embodiment of FIG. 1 and foaming a repair patch 22 is applied over the damaged area, the coating 10 being disposed against the substrate surface 16. A squeegee wiping technique is used to push the air out of the interface between the prepreg 2 and the surface 16. The UV blocking backer 11 is then removed. Any excess coating resin squeezed out from beneath the prepreg 2 can be smoothed over the repair, particularly at the edges of the prepreg ply where there is a height drop. With the UV blocking backer 11 removed after the patch 22 is applied, this initiates the resin curing process under ambient environmental conditions. The patch 22 repair can be cured in ambient sunlight, optionally additionally using a UV lamp to provide a higher intensity of UV radiation to accelerate the curing process and provide improved mechanical and chemical properties of the cured resin material.

An adjacent patch may then be applied to continue the repair. The coating 10 on the prepreg allows the next patch to be first placed on the substrate and then slid on the coating 10 to accurately align that patch to the previously applied patch.

The prepreg of the embodiment of FIG. 2 may be used in the following repair process, illustrated with reference to FIG. 4, by way of example.

A plurality of prepreg plies 20 having the structure of the embodiment of FIG. 2, but without the coating resin layer, are laid one upon the other to form a multilayer stack 18, with successive plies being laterally partially overlapping to form a staggered layer structure at the peripheral edges of the stack 18. In the illustrated embodiment of FIG. 4 there are three prepreg plies 20a, 20b, 20c in each stack 18. Then the stack 18 of the prepreg plies with staggered layers is pre-consolidated under applied heat and pressure to form a repair patch 22. On one side an oversize UV blocking backer film (not shown), similar to that shown in FIG. 1, is fitted to the repair patch 22. These steps to form a repair patch 22 may be performed at the prepreg manufacturing facility, or in the field.

As for the first embodiment, in a first step in the repair process the substrate surface 46 to be repaired is abraded, for example by a sanding disc, to provide a sound, roughened surface. The substrate 46 is contoured and comprises a leading edge 49 of a wind turbine blade. The wet patch 22 is provided, by a wet paste being applied to the side of the repair patch 22 which is not coated with the UV blocking backer film. The wet paste is smoothed onto the surface of the repair patch 22. The repair patch 22 is then applied over the damaged area 47 of the substrate surface 46, with the wet paste being pressed against the surface 46. A squeegee and laminating wiping technique is again used to push any entrapped air out of the interface. Any excess wet paste resin squeezed out can be smoothed over the repair, particularly at the ply drops. The UV blocking backer film is removed after the repair patch 22 has been applied, to begin the curing process. The next repair patch 22 is then applied adjacent to the previous patch 22, and optionally partially overlapping as shown in FIG. 4, in order to continue the repair process.

In an alternative embodiment, instead of using heat and pressure to consolidate together the plural prepreg layers of the repair patch, additional wet paste resin could be used to provide adhesion between adjacent prepreg plies of the repair patch 22. However, this expedient would tend to increase the overall weight of the repair.

For either embodiment, if a large and/or deep hole or cavity is present in the damaged zone, additional wet resin from a separate supply independent of the prepreg, can be first applied to the substrate, before application of the prepreg, and smoothed into the hole or cavity. This will then co-cure with the prepreg matrix resin and with the coating material. It has been found that this technique works well, because a natural smoothing occurs, which reduces the need, after curing of the prepreg patch, of any final filling and fairing work.

For either embodiment, practical testing shows that for a typical leading edge repair on a wind turbine blade, patches having a length of from 250 to 750 mm, more preferably from 400 to 600 mm, typically about 500 mm, work well for operator handling and air removal. These modular patches can be applied serially, with some overlapping, so that the repaired area can be extended for any length or width of repair. The size of the repair patch is material, since if the patch becomes too large it becomes difficult to put on and squeegee out the air that can get trapped under the patch. It has been found that by using prepreg patches of significantly greater length, such as greater than 750 mm, the repair process actually takes longer per linear meter to apply. If the patch length is 1 meter or greater the patch application process becomes too difficult for the operator to handle the prepregs in the field and more air tends to be trapped beneath the prepreg. Shorter patches of less than 250 mm in length require too many patches to be applied per linear meter for an efficient repair process to be achieved. In a repair requiring more than one patch a shorter patch which is either cut, or prepared to size, it is useful to match the remaining geometry to be repaired to avoid grinding the repair area to match the integer multiples of the patch geometry.

For either embodiment, after completing the patch application and resin curing process, if any voids are found beneath the cured composite material formed from the fibrous reinforcement resin matrix material, two adjacent holes can be drilled into the defect and additional wet paste can be injected through one hole to fill the void, with the other hole acting as a vent for the displaced air.

For either embodiment, the multipurpose wet, or another UV curing paste, can then be applied over the patch and/or the edges of the patch and smoothed over, and optionally an easy to sand filling compound is applied thereover for a final filling and fairing step.

The repair can be faired back to the desired surface and a final top coat, for example of gelcoat resin or paint, applied.

A particular advantage of the method of the second embodiment is the achievement of a high speed for the final repair. The patches can be assembled on site in the field but out of the sunlight. Alternatively, photo-initiators not activated by ambient sunlight can be selected. The plies of the patches can be cut on site to the desired lateral dimensions, and a desired number of plies can readily be incorporated into the required patch. The repair process on site is quick because for each repair area plural prepreg plies can be applied in a single application step. The facility to produce, on site, custom-made dimensionally accurate repair patches is easy, since the moderate to low tack prepreg is easy to handle compared to a wet-preg prepared using a wet lamination process. Furthermore, the step of applying the wet paste the prepreg is also quick and easy. This can be preliminarily done off-line and the prepreg stored prior to use. As an alternative to patch manufacture in the field, pre-made patches of standard dimensions may be employed. However, making the patches on site immediately prior to use for a specific repair dimension can give maximum flexibility for achieving the required final dimensional size and thickness of the repair. By providing a prepreg and associated repair process adapted to repair composite structures using a mixture of a UV priming layer and UV curable pre-preg, this can significantly increase the speed of repair and maximise the weather window for the on site repair.

Since the UV curable resin materials are protected by a UV blocking backer film, the resins can be formulated to cure quickly in sunlight to provide a fast cure. Removing the backer film once the first repair patch is in place then allows the sunlight to gel the resin quickly, locating the patch securely in its desired position, which is advantageous since the subsequent patch placement would not cause inadvertent movement of the previously applied repair patch when a series of repair patches is applied sequentially. The low viscosity of the wet resin allows the more rigid (but drapable) prepreg patch to be slid around on the wet resin so that the joins between adjacent repair patches accurately meet up, in a desired overlapping relationship, and the higher viscosity prepreg resin prevents distortion of the patch geometry and fibres.

In the patch of the first embodiment it sometimes can be difficult to remove the backer on the wet side without preliminarily chilling the prepreg, as discussed above, because the wet resin tends to be wet and sticky. With the patch of the second embodiment, a backer film does not need to be applied to the wet resin, because the wet is only applied at the point of repair, and so the operator, the substrate and the workspace tend to remain cleaner.

In accordance with another aspect of the present invention, a holder for the coated prepregs is provided which enables the prepregs readily to be stored and transported to the repair area without premature resin curing and ensuring that the wet resin surface is not inadvertently damaged.

Referring to FIG. 5, a holder 50 according to one embodiment comprises a hollow rigid elongate tube 52 of material which is substantially opaque to UV radiation, for example of plastic or cardboard. The tube 52 in the Figure has a square cross-section, for example 60 mm square, which is suitable for storing a prepreg 54 having a width of 150 mm. The dimensions are selected so that the prepreg 54 can have one outer surface 56, which is the surface free of wet resin, lying generally adjacent to the inner surface 58 of the hollow tube 52 but without being folded or wrapped back on itself so that the wet resin layer 60, lying on the prepreg layer 62 does not contact any part of the tube 52 or another edge of the prepreg 54. Also, the prepreg 54 is deformed by bending within the tube 52 and the restorative force back towards a planar configuration urges the prepreg 54 against the inner surface 58. This inhibits the prepreg 54 from inadvertently falling out of the tube 52. The UV blocking backing film 64, if provided, covers the outer surface 56. The UV blocking backing film 64 is preferably oversized to enable it readily to be manually picked up to pull the prepreg out of the tube 52 when required. One or both ends of the tube 52 may be covered with UV blocking removable end caps 66. One end may be provided with a fixed end wall.

An alternate geometry for holding a 150 mm wide prepreg is a 60 mm diameter circular cross-section or a 100 mm diameter circular cross-section.

Figure 6:
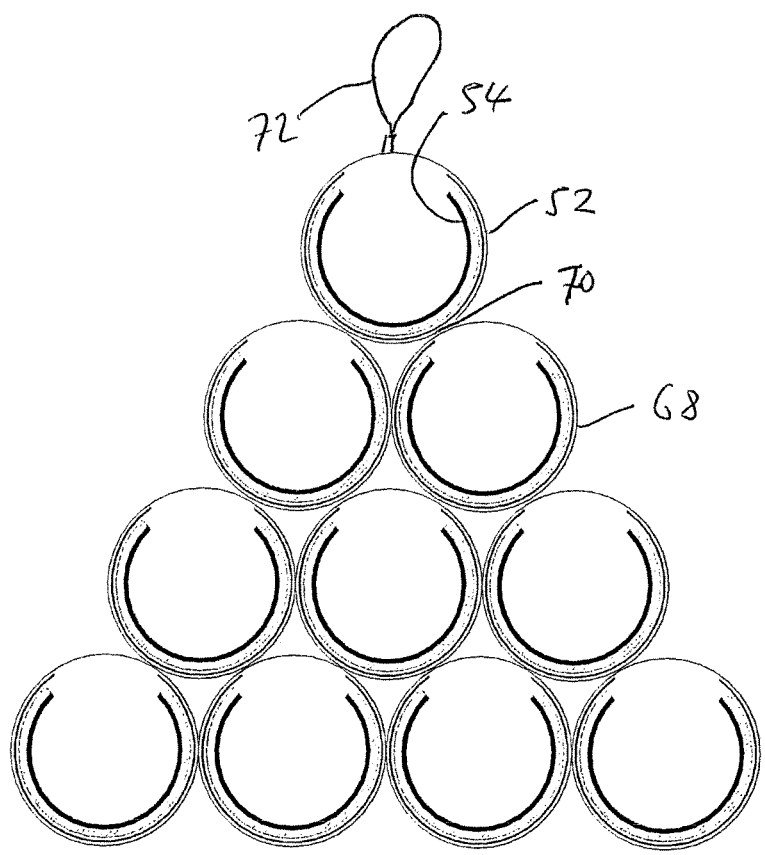
FIG. 6 is an end view of a holder for a prepreg in accordance with a yet further embodiment of the present invention.

As shown in FIG. 6, for carrying a plurality of prepregs 54, a plurality of tubes 52 may be provided which are connected at their outer surfaces 70, for example by adhesive or thermal bonding, to form an array 68 of interconnected tubes 52.

The tube 52 or the array 68 may be provided with an attachment or handle, such as shown by handle 72 for ease of carrying or transportation.

These tubular structures can readily be transported, and are lightweight and durable. For example, a tube or array thereof carrying the prepregs can readily be lowered on a rope to an operator repairing a wind turbine blade in situ.

The preferred embodiments of the present invention have particular application in the repair of fibre-reinforced resin matrix composite components in the field. In particular, the preferred embodiments of the present invention have particular application to the repair of wind turbine blades, specifically the leading edge of such blades which can become damaged during service, for example by impact, e.g. by birds. The preferred embodiments of the present invention may also be used to repair other components, such as pipes or concrete structures, or to provide additional strengthening to structures in the field.

The preferred embodiments of the present invention can provide particular advantages over known repair systems, namely fast prepreg application to the product or structure to be repaired and fast curing of the curable resin of the prepreg. Such fast curing may be achieved across a wide range of ambient temperatures and ambient humidity. This in turn can provide the user with an ability to repair damaged composite material surfaces in a wider weather window than known repair systems, which in turn can significantly increase the proportion of time available to repair such structures in-situ. When the structure to be repaired is a blade of a wind turbine, the use of the prepreg and process of the preferred embodiments of the present invention can reduce the downtime of the wind turbine and can increase the number of blades which can be repaired per day, thereby saving significant costs associated with crane hire and lost performance.

The preferred embodiments of the present invention utilise a wet resin applied to the prepreg during a prepreg manufacturing step or during the repair process, for example immediately prior to application of the prepreg to the substrate to receive the prepreg, which has been formulated to provide enhanced adhesion and toughness to the substrate as compared to the use of a prepreg without such a wet resin.

The preferred embodiments of the present invention therefore provide a dual viscosity prepreg which, once applied to the substrate to be repaired, incorporates a wet resin which has:

a) Low enough viscosity to allow the wet to function as a fluid to enable entrapped air to be readily pushed out manually after the prepreg has been applied to a substrate, this enabling a squeegee, rather than vacuum bagging, to be employed in order reliably to adhere a single prepreg ply or a pre-consolidated patch of shaped prepreg plies without air entrapment, and yet providing some positional movement between the prepreg and the substrate to ensure that the specific position of the patch can readily be slidably adjusted to its desired location;

b) High enough sag resistance to prevent the patch from moving out of positional tolerance (e.g. +/−3 mm) before the UV curable resin gels and cures;

c) Sufficient wettability and adhesion to be able to wet and bond to a variety of different substrates, for example polyester or epoxy resin laminates, which are typically employed for fibre reinforced resin matrix composites; and d) Gellability in ambient light, for example in sunlight, and which can at least partially cure in such ambient light, typically sunlight, or alternatively only when subjected to higher energy UV radiation from a UV source.

As well as acting as a coating wet layer on the prepreg, the wet resin can function as a fill and fair compound or an injection compound for filling voids formed between the repair and the substrate, and so is a multipurpose material in the repair process.

The pre-preg resin has a sufficient viscosity to provide drape but maintain fibre alignment of the cut piece without excessive tack.

The wet should preferably have 1.5 mm sufficient sag resistance before beginning to cure and more preferably 3 mm sag resistance for avoiding dripping onto the blade repair.

The preferred embodiments of the present invention can provide improved mechanical performance of the repaired portion of the substrate surface as compared to the use of a wet-lamination process to make the repair.

In the preferred embodiments of the present invention, wet resin is applied to the prepreg and not the substrate. If instead the wet resin is applied to the substrate, it is more difficult to ensure that the wet resin is applied in the correct place, which risks encountering problems due to dry spots and/or unwanted or excess wet resin. If the wet resin is applied to the substrate, there is a risk of inadvertently dripping wet resin onto the prepreg laminate away from the repair area, and also more wet resin than necessary may be applied, which requires removal during the squeegee stage. Yet further, the wet resin on the substrate would be readily exposed to sunlight immediately after application, and would begin to cure, requiring the wet resin to be formulated for a long working time, which in turn would lead to an undesirably long final cure (unless a UV lamp was intended to be used). Any excess wet resin would tend to cure and would need to be removed before the next prepreg patch is applied, because such excess resin would leave a high spot.

The present invention is further described with reference to the following non-limiting Examples.

EXAMPLE 1

A prepreg resin containing 2 unsaturated methacrylic groups was manufactured from an epoxy resin and unsaturated acid to form the unsaturated epoxy ester 2,2 propyl[di 1,1'(phenyl 4,4'{2-hydroxypropyl ether})]di[ethyl methacrylate]benzene 1,2 dicarboxylate with a theoretical average molecular weight of ~912.

The resin was manufactured by, in a first reaction step, reacting for a period of 2 hours at a temperature of 100° C. 1 mole of hydroxy ethyl methacrylate (HEMA) with 1 mole part of phthalic anhydride to produce HEMA Phthalate.

Then, in a second reaction step, 2 moles of HEMA Phthalate was reacted with 1 mole of a di-functional diglycidyl ether bisphenol A epoxy resin having a molecular weight of about 354 (available in commerce under the trade name DER330) for a period of 8 hours at a temperature of 100° C. This provided the unsaturated monomer of the prepreg resin.

Subsequently, a photoinitiator curing agent to act as a polymerisation catalyst for the unsaturated monomer was incorporated into the reaction product by dispersing 1 wt % of a commercially available curing agent, available in commerce as Irgacure 819, at a temperature of 100° C. into the resin.

600 gsm+/−45 E-Glass biaxial fabric was impregnated with this resin at a temperature of 85° C., as a hot melt adhesive, to a resin content of 42%.

A 4 ply laminate of the prepreg was first consolidated under vacuum, and subsequently cured by exposure to UV light for a period of 10 minutes at a location 475 mm below the surface of a 800 W UV undoped mercury flood lamp, Serial Number 574 from UV Light Technology.

This formed a fibre-reinforced resin matrix composite material having a normalised 53% fibre volume fraction.

The mechanical properties of the resultant cured laminate were measured and are shown in Table 1.

TABLE 1

| Direction | | Example 1 | Comparative Example 1 |
|---|---|---|---|
| 45 degrees to roll direction (0 degrees to fibre) | Tensile modulus - GPa | 30.6 | 26.2 |
| 45 degrees to roll direction (0 degrees to fibre) | Tensile strength - MPa | 545.9 | 407.5 |
| 45 degrees to roll direction (0 degrees to fibre) | Tensile strain at break % | 2.49 | 2.00 |
| 45 degrees to roll direction (0 degrees to fibre) | Interlaminar shear strength - MPa | 42.0 | 41.7 |

This was compared to an equivalent difunctional DEGBA epoxy prepreg 600 gsm+/−45 biaxal prepreg available in commerce as Gurit WE91-2 from Gurit (UK) Limited, indicated in Table 1 as Comparative Example 1.

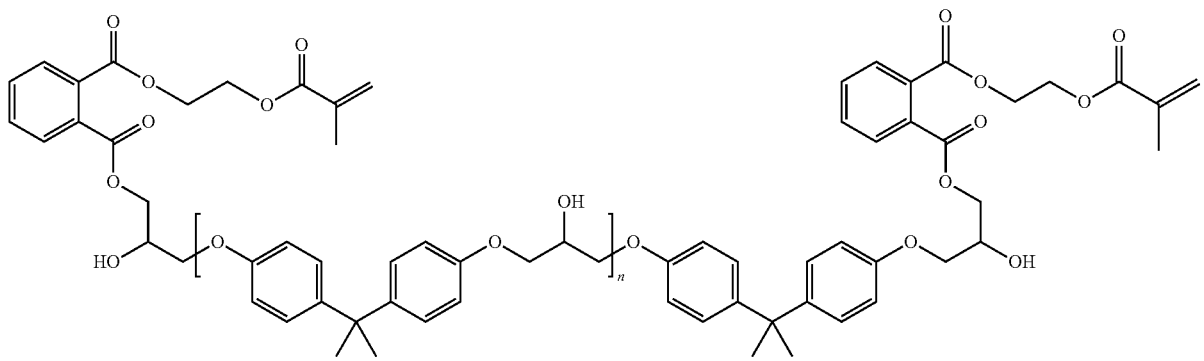

The mechanical performance of the composite material produced using the prepreg of Example 1 can be seen to be superior to that produced using the epoxy resin prepreg of Comparative Example 1.

For a laminate composed of a plurality of the prepregs of Example 1, the development of the interlaminar shear strength (ILSS) with respect to UV exposure time was measured for different light intensities and is shown in FIG. 5. Typical polyester wet-laminate repairs resins exhibiting 5-15 Mpa ILSS depending on laminate quality and cure, Epoxy wet laminates typically exhibiting an ILSS between 10-25 MPa depending on laminate quality and cure. It may be seen that the use of an 800 W UV lamp provided the quickest curing and the greatest interlaminar shear strength. Even only in sunlight, properties equivalent to polyester repairs were achievable.

EXAMPLE 2

Coating resins were made by blending different ratios of 2HPE resin from Example 1, with Scott Bader Crystic 2-406 Pa unsaturated polyester resin, optionally with M5 silica as a thixotropic agent, to form paste-like coating resins.

The working time of the resin blends when exposed to sunlight at 20 C was approximately 0.5 to 3 minutes depending on the sunlight conditions.

The ease of spreading the coating resin onto a prepreg, the resin sag resistance, and the sag levels, of a prepreg patch of 2400 gsm fibres impregnated with 44 wt % resin prepared in accordance with Example 1, and coated with 400 gsm of the coating resin, were assessed. The ability to apply the patch air-free onto a substrate was assessed by first applying the resin to a 500 mm long by 150 mm wide pre-preg patch and floating the patch, using the slidable wet coating resin, onto an abraded substrate using a squeegee technique to work air bubbles to the extremities of the prepreg.

Table 2 shows that a variety of resin compositions for the coating resin can be formulated as to exhibit the desired properties of viscosity so as to be spreadable, exhibiting air removal and sag resistance at a desired working ambient temperature. The resin compositions consisted of various combinations of the 2HPE and PE resins used for the Example 2 as discussed above, optionally containing the silica thixotropic agent M5.

By modification of the resin formulation, by varying the proportional amounts of the unsaturated 2HPE monomer and the polyester resin, the resin properties can be tailored to achieve the required performance at a selected ambient temperature.

Formulations C, D and E in Table 3 all have the addition of a thixotropic agent, silica, provides enhanced sag control (high viscosity at a shear rate around 1 to 2 $s^{-1}$) without increasing resin viscosity at low shear rates, resulting in a readily spreadable resin paste providing good air removal (low viscosity at a shear rate around 100 to 165 $s^{-1}$).

EXAMPLE 3

To test the adhesion of the prepreg of embodiments of the invention to a substrate by use of the coating resin, a coating resin consisting of 60 parts 2HPE and 40 parts Scott Bader Crystic 2-406 Pa unsaturated polyester resin was made having a viscosity of 155 Pa·s at measured at a shear rate of 100 $s^{-1}$ at 20° C. and 305 Pa·s at measured at a shear rate of 1 $s^{-1}$ at 20° C.

Double lap shear coupons were prepared by abrading polyester and epoxy laminate substrates. A central cut was made down the centre of the panel and the panel halves were then butted back together. A 40 mm wide pre-preg strip consisting of 3×600 gsm prepreg of Example 1 was coated with the above coating resin. This prepreg with coating resin was pressed onto the substrate. The roll direction of the prepreg was applied parallel to the cut direction, giving +/−45 fibres relative to the gap between the substrate halves.

The prepreg was then exposed to UV light for a period of 10 minutes at a location 475 mm below the surface of an 800 W UV undoped mercury Flood lamp, Serial Number 574 from

TABLE 2

| Viscosity and Associated Property | | A | B | C | D | E | F | G | H |
|---|---|---|---|---|---|---|---|---|---|
| Composition—2HPE/PE/SiO2 (pbw) | | 64/36/0 | 60/40/3 | 58/42/3 | 50/50/5 | 50/50/3 | 56/44/0 | 54/46/0 | 50/50/0 |
| Viscosity/Pa·s (20 C. at 1 s−1) | Low Shear (Sag) | 351 | 513 | 372 | 750 | 351 | 133 | 105 | 78 |
| Viscosity/Pa·s (20 C. at 2 s−1) | Low Shear (Sag) | 331 | 436 | 311 | 492 | 251 | 116 | 90 | 72 |
| Viscosity/Pa·s (20 C. at 10 s−1) | Mid Shear | 316 | 363 | 232 | 242 | 147 | 103 | 76 | 61 |
| Viscosity/Pa·s (20 C. at 20 s−1) | Mid Shear | 311 | 344 | 212 | 195 | 127 | 101 | 74 | 59 |
| Viscosity/Pa·s (20 C. at 100 s−1) | Mid Shear (Spread & air remove) | 262 | 228 | 163 | 119 | 98 | 94 | 69 | 55 |
| Viscosity/Pa·s (20 C. at 165 s−1) | Mid Shear | 193 | 146 | 131 | 92 | 80 | 86 | 64 | 52 |
| Ease of spreading | | Borderline | Borderline | Good | Good | Good | Good | Good | Thickness build more difficult |
| Ease of Air Removal | | Difficult | Borderline | Good | Good | Good | Good | Good | Good |
| Any drip/excessive flow as applied | | No | No | No | No | No | No | No | Some excess spew |
| 1 min Resin Sag Resistance/mm | | 4 | 4 | 4 | >5 | 3 | 1.5 | 1 | 1 |
| Sag in 1 min of this coating on 2400 gsmPre preg 44% | | 1.5 | 1.5 | 2 | 1.5 | 3.5 | 4.5 | 5 | 8 |
| Conclusion | | Upper limit of air removal | Borderline air removal | Suitable | Suitable | Suitable | Upper sag limit | Upper sag limit | Upper sag limit |

UV Light Technology. The coupon sample of substrate was then turned upside down and the procedure repeated on this new face, by applying a prepreg to the opposite face, to provide a repair of substrate sandwiched between opposite prepregs. Subsequently, 25 mm wide test coupons were then cut and tested to obtain the mechanical properties of the laminate, in particular to determine the mean failure shear stress of the repair.

Epoxy laminate repairs are known to sensitive to the presence of unreacted polyester monomers. The ability to cure to a polyester laminate cured 24 hrs at 20° C. (fresh) against a post-cured polyester laminate (aged) to increase the level of cure conversion was tested. The samples were also compared against a standard wet laminating polyester resin repair. Samples were tested directly after the repair and after being immersed at for 4 weeks at 50° C. to test the longer term integrity of the repair. The results are shown in Table 3

TABLE 3

| Substrate | Value/Mpa | After 4 weeks 50° C. Value/Mpa |
|---|---|---|
| Polyester Fresh | 7.9 (Wet Laminate polyester control) | 7.4 (Wet Laminate polyester control) |
| Polyester (Aged) | 9.2 (Wet Laminate polyester control) | 7.6 (Wet Laminate polyester control) |
| Polyester (Fresh) | 10.3 | 9.4 |
| Polyester (Aged) | 7.5 | 5.3 |
| Epoxy | 8.4 | 8.8 |

From Table 3 it may be seen that the coated prepreg of the present invention can provide good adhesion and a durable repair to a variety of resin substrates, yielding a high shear stress of the repair. This indicates that the coated prepreg can reliably be used to produce a repair on fibre-reinforced resin matrix composite materials having different matrix resins.

EXAMPLE 4

The variation of viscosity with shear rate was tested for a number of the coating resin samples prepared according to the previous examples. The results are shown in FIG. 7. It was found that there was a preferred viscosity range for the coating resin at each shear rate. FIG. 7 shows the variation of the preferred viscosity ranges with change in shear rate, the upper line marked X representing a preferred upper threshold of viscosity at relatively high shear rate of at least $100\,s^{-1}$ and the lower line marked Y representing a preferred lower threshold of viscosity at relatively low shear rate of at most $1\,s^{-1}$. Line X is a lower limit of a high shear zone I and line Y is an upper limit of a low shear zone II, the preferred wet coating resins having viscosity falling outside these zones at the respective shear rates.

In particular, it should be noted that for a shear rate of from $100\,s^{-1}$ to $1000\,s^{-1}$, the viscosity should be below the upper threshold line, otherwise at these shear rates, representing typical shear rates during spreading of the coating resin and sliding of the prepreg into position on the substrate, the viscosity is too high to permit effective spreading of, and air removal from, the coating resin. The hatched area I represents viscosity values where the resin viscosity is generally too high within this relatively high shear rate range.

It should also be noted that for a relatively low shear rate of up to $1\,s^{-1}$, the viscosity should be above the lower threshold line, otherwise at these shear rates, representing typical shear rates when the resin is stationary on the prepreg or in a filled cavity, the viscosity is so low that the coating resin may sag or drip. The hatched area II represents viscosity values where the resin viscosity is generally too low within this relatively low shear rate range. However, such low viscosity values at these low shear rates can be accommodated in the prepreg application process by preliminary or prompt UV curing of the coating resin causing the coating resin partially to cure and thereby to increase in viscosity.

Preferably, the viscosity of the coating resin is at most 275 Pa·s at a shear rate of $100\,s^{-1}$, and more preferably additionally viscosity of the coating resin is at least 130 Pa·s at a shear rate of $1\,s^{-1}$.

The viscosity and shear measurements of FIG. 7 were obtained at a testing temperature of 20° C. However, the viscosity/shear rate relationship shown is preferably obtained by appropriate resin formulation for any working temperature falling with in the preferred ambient temperature range of from 5 to 35° C., and particularly at at least one of those temperature values. It is particularly important to provide coating resins having the desired viscosity, most particularly so as to be spreadable and to permit air escape at relatively high shear rates during application, when the coating resin is used at lower ambient temperatures, for example from 5 to 15° C. From the previous examples, it may be seen how to formulate resins, optionally including viscosity modifiers such as thixotropic agents, with the required viscosity for any intended working temperature range. The resins of the invention do not need to provide the desired viscosity performance across the entire possible ambient temperature range likely to be used in practical application

The invention claimed is:

1. A process for bonding a cured prepreg to a surface of a substrate, the process comprising the steps of:
   (i) providing a prepreg comprising a fibrous reinforcement layer at least partially impregnated with a matrix resin having a first viscosity, a first side of the fibrous reinforcement layer carrying a coating of a wet resin having a second viscosity, the first viscosity being higher than the second viscosity, both the matrix resin and the wet resin being curable by ultraviolet radiation;
   (ii) applying the prepreg to the substrate by urging the coating against the substrate surface; and
   (iii) curing the matrix resin and the wet resin at substantially the same time using ultraviolet radiation.

2. A process according to claim 1 wherein during step (ii) manual pressure is applied as a wiping motion against an outer surface of the prepreg to remove entrapped air from between the fibrous reinforcement layer and the substrate.

3. A process according to claim 2 wherein the wiping motion smoothes out the outer surface of the prepreg by levelling the wet resin thereunder.

4. A process according to claim 2 wherein the wiping motion is carried out by using a flexible blade.

5. A process according to claim 1 wherein the matrix resin and the wet resin each comprise a thermosetting resin, which may be the same or different, each thermosetting resin having one or more ethylenically unsaturated copolymerisable monomers, in combination with a photoinitiator.

6. A process according to claim 5 wherein each thermosetting resin comprises at least one monomer selected from polyester, vinyl ester or acrylic ester.

7. A process according to claim 6 wherein each thermosetting resin comprises at least one acrylate and/or methacrylate monomer.

8. A process according to claim 1 which is a process for repairing a damaged surface of the substrate.

9. A process according to claim 8 wherein the substrate is a fibre reinforced matrix resin composite material.

10. A process according to claim 9 wherein the substrate comprises a wind blade.

11. A process according to claim 1 wherein the viscosity of the wet resin is at most 275 Pa·s at a shear rate of $100\ s^{-1}$ measured at a temperature of at least one of 5° C., 20° C. or 35° C.

12. A process according to claim 11 wherein the viscosity of the wet resin is at least 130 Pa·s at a shear rate of $1\ s^{-1}$ measured at a temperature of at least one of 5° C., 20° C. or 35° C.

13. A process according to claim 1 further comprising the step, before step (i), of applying the coating to the first side of the fibrous reinforcement layer.

14. A process according to claim 1 further comprising the step, before step (ii), of applying additional wet resin to fill holes, cavities or low spots in the substrate surface.

15. A process according to claim 1 wherein the prepreg provided in step (i) has a removable flexible film which acts as a barrier to ultraviolet radiation provided on a second side of the fibrous reinforcement layer, and prior to the curing step (iii) the flexible film is removed so as to expose the prepreg to ultraviolet radiation.

16. A process according to claim 1 wherein the prepreg comprises a plurality of fibrous plies arranged in a staggered overlapping configuration.

17. A process according to claim 1 wherein a plurality of the prepregs are applied sequentially to the substrate surface, each subsequently applied prepreg partially overlapping a previously applied prepreg.

18. A process according to claim 1 wherein the prepreg has a maximum lateral dimension of from 250 to 750 mm.

19. A process according to claim 1 wherein the prepreg is cut to a shape and dimensions substantially corresponding to those of the surface of the substrate to be covered by the prepreg.

20. A process according to claim 1 wherein during applying step (ii) the prepreg is slid into a desired position on the substrate surface by causing flow of the wet resin coating.

21. A process according to claim 1 wherein after the curing step (iii) additional wet resin is injected into a void between the cured prepreg and the substrate surface.

22. A process according to claim 1 wherein step ii is carried out at an ambient temperature at which temperature the viscosity of the wet resin is at most 275 Pa·s, optionally from 40 to 275 Pa·s.

23. A process according to claim 1 wherein the matrix resin has a viscosity of from $1\times10^4$ to $2\times10^6$ Pa·s at 20° C.

24. A process according to claim 1 wherein the prepreg is non-rigid.

* * * * *